United States Patent
Acharya et al.

(10) Patent No.: US 11,843,824 B2
(45) Date of Patent: Dec. 12, 2023

(54) DIGITAL PROCESSING SYSTEMS AND METHODS FOR MANAGING PRESENTATION OF STREAM PORTIONS

(71) Applicant: Synamedia Limited, Staines Upon Thames (GB)

(72) Inventors: Shwetang Acharya, Bangalore (IN); Ian Bastable, Fareham (GB); Salik Miah, Portsmouth (GB)

(73) Assignee: SYNAMEDIA LIMITED, Staines Upon Thames (GB)

( * ) Notice: Subject to any disclaimer, the term of this patent is extended or adjusted under 35 U.S.C. 154(b) by 0 days.

(21) Appl. No.: 17/538,434

(22) Filed: Nov. 30, 2021

(65) Prior Publication Data
US 2023/0117452 A1   Apr. 20, 2023

(30) Foreign Application Priority Data
Oct. 18, 2021  (IN) .............................. 202111047081

(51) Int. Cl.
| | |
|---|---|
| *H04N 21/433* | (2011.01) |
| *H04N 21/438* | (2011.01) |
| *H04N 21/81* | (2011.01) |
| *H04N 21/45* | (2011.01) |
| *H04N 21/4335* | (2011.01) |
| *H04N 21/437* | (2011.01) |

(52) U.S. Cl.
CPC ....... *H04N 21/4383* (2013.01); *H04N 21/437* (2013.01); *H04N 21/4335* (2013.01); *H04N 21/4532* (2013.01); *H04N 21/812* (2013.01)

(58) Field of Classification Search
None
See application file for complete search history.

(56) References Cited

U.S. PATENT DOCUMENTS

| | | |
|---|---|---|
| 2003/0046690 A1 | 3/2003 | Miller et al. |
| 2006/0013554 A1* | 1/2006 | Poslinski ........... H04N 21/4828 386/250 |

(Continued)

FOREIGN PATENT DOCUMENTS

EP    1207696 B1    10/2003

*Primary Examiner* — Jefferey F Harold
*Assistant Examiner* — Charles N Hicks
(74) *Attorney, Agent, or Firm* — FINNEGAN, HENDERSON, FARABOW, GARRETT & DUNNER LLP

(57) ABSTRACT

Systems, methods, and computer-readable media for managing presentation of stream portions are disclosed. The systems and methods may involve receiving a first list of stream portions; determining a first set of high-priority stream portions; retrieving at least one portion of the first set of high-priority stream portions; storing the retrieved portion of the first set of high-priority stream portions; receiving a second list of stream portions; determining a second set of high-priority stream portions; determining whether any stream portions in the stored portion of the first set of high-priority stream portions are not in the second set of high-priority stream portions; deleting from the memory any stream portions in the stored portion of the first set of high-priority stream portions that are not in the second set of high-priority stream portions; and determining whether any stream portions in the second set of high-priority stream portions are not stored in memory.

19 Claims, 7 Drawing Sheets

(56) References Cited

U.S. PATENT DOCUMENTS

2008/0271067 A1* 10/2008 Li .................... H04N 21/44224
                                                                  725/32
2009/0077580 A1   3/2009 Konig et al.
2011/0289524 A1  11/2011 Toner et al.
2018/0199074 A1*  7/2018 Potesta ............ H04N 21/23424

* cited by examiner

| Advert ID | Channel ID | Start Time | Duration (sec) | Auxiliary Information |
|---|---|---|---|---|
| 592733814 | 101 | 2020-04-25T20:05:30 | 30 | "Group:1,Region:1,Priority:1,Advert_Name:Coke" |
| 559167094 | 203 | 2020-04-25T20:07:30 | 20 | "Group:1,Region:2,Priority:1,Advert_Name:BournVita" |
| 338966050 | 502 | 2020-04-25T20:10:55 | 10 | "Group:2,Region:1,Priority:2,Advert_Name:Nestle" |
| 592733814 | 104 | 2020-04-25T20:12:10 | 30 | Group:2,Region:1,Priority:1,Advert_Name:Coke |
| 338966050 | 507 | 2020-04-25T20:15:20 | 10 | "Group:1,Region:1,Priority:2,Advert_Name:Nestle" |
| 559167094 | 206 | 2020-04-25T20:17:35 | 20 | "Group:1,Region:2,Priority:1,Advert_Name:BournVita" |

FIG. 3

DIGITAL PROCESSING SYSTEMS AND METHODS FOR MANAGING PRESENTATION OF STREAM PORTIONS

CROSS-REFERENCE TO RELATED APPLICATIONS

This application claims the benefit of priority of India Patent Application No. 202111047081, filed on Oct. 18, 2021, currently pending, which is incorporated herein by reference in its entirety.

TECHNICAL FIELD

Embodiments consistent with the present disclosure include systems and methods for managing presentation of stream portions. The disclosed systems and methods may be implemented using a combination of conventional hardware and software as well as specialized hardware and software, such as a machine constructed and/or programmed specifically for performing functions associated with the disclosed method steps. Consistent with other disclosed embodiments, non-transitory computer-readable storage media may store program instructions, which may be executable by at least one processing device and perform any of the steps and/or methods described herein.

BACKGROUND

Modern broadcast systems often require stream portions to be transmitted in separate auxiliary channels for acquisition by the client devices prior to presentation to the user. In many cases, this requires additional setup and logic in the broadcast system and in the client devices. It may thus be desirable to avoid transmitting the same stream portions, such as advertisements, over separate auxiliary channels. Accordingly, in some cases, it may be useful to retrieve a stream portion for later presentation from a background channel, which may be subsequently retrieved and presented upon receipt of a marker. Moreover, in some cases, it may be challenging to manage bandwidth, memory, or other resources when transmitting stream portions across the separate auxiliary channels. Accordingly, it may be desirable to utilize one or more lists of stream portion to allocate resources for high-priority stream portions. For example, it may be desirable to retrieve the high-priority stream portions from a background channel and store them in memory prior to presentation in order to increase efficiency, thereby obviating the need for an auxiliary channel or repeated broadcast of the high-priority stream portions across multiple auxiliary channels.

Moreover, in many cases, it would be desirable to control presentation of stream portions to ensure that the stream portions are presented in a desired manner or for a desired duration. For example, a user may have a tendency to change to another channel as soon as an advertisement starts. In such cases, it may be desirable to block or delay the channel change until the advertisement ends. This may result in extracted valuable viewing time that would otherwise be lost. To manage the challenging operations, systems and methods for managing presentation of stream portions may be used. Such systems and methods facilitate the planning and routing of resources between broadcast systems and client devices to ensure the desired presentation of stream portions. In sum, it would be useful to improve systems and methods for managing presentation of stream portions to increase operation efficiency and value.

SUMMARY

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes a computer-implemented method for managing presentation of stream portions on a client device. The computer-implemented method also includes receiving a first list of stream portions associated with a first plurality of stream portions; determining a first set of high-priority stream portions from the first plurality of stream portions; retrieving from a channel at least one portion of the first set of high-priority stream portions; storing in a memory the retrieved portion of the first set of high-priority stream portions; receiving a second list of stream portions containing a second plurality of stream portions; determining a second set of high-priority stream portions from the first set of high-priority stream portions and the second plurality of stream portions; determining whether any stream portions in the stored portion of the first set of high-priority stream portions are not in the second set of high-priority stream portions; deleting from the memory any stream portions in the stored portion of the first set of high-priority stream portions that are not in the second set of high-priority stream portions; determining whether any stream portions in the second set of high-priority stream portions are not stored in the memory; retrieving from the channel at least one portion of any stream portions in the second set of high-priority stream portions that are not stored in the memory; storing in the memory the retrieved portion of any stream portions in the second set of high-priority stream portions that are not stored in the memory; upon receipt of a marker, retrieving from the memory a particular stream portion, where the marker indicates presentation of the particular stream portion; and presenting the particular stream portion to the client device. Other embodiments of this aspect include corresponding computer systems, apparatus, and computer programs recorded on one or more computer storage devices, each configured to perform the actions of the methods.

Implementations may include one or more of the following features. The first list of stream portions may include a first plurality of priority values, and the second list of stream portions may include a second plurality of priority values. The first plurality of priority values and the second plurality of priority values may be associated with numeric values or one or more characteristics of a user associated with the client device. At least one portion in the first list of stream portions may be associated with a first time window, and at least one portion in the second list of stream portions may be associated with a second time window. A first set of stream portions in the first plurality of stream portions or second plurality of stream portions may be associated with a first plurality of client devices, and a second set of stream portions in the first plurality of stream portions or second plurality of stream portions may be associated with a second plurality of client devices. The method may include: requesting the first list of stream portions when the client device is connected to a first group of channels; and requesting the second list of stream portions when the client device is connected to a second group of channels. The method may include: determining whether the client device is attempting to connect from a first channel to a second channel during the presentation of the particular stream portion; and preventing connection to the second channel during the presentation of the particular stream portion. The method may include: presenting to the client device information associated with the second channel. The method may include: presenting to the client device a countdown timer indicating a remaining duration of the presentation. Implementations of the described techniques may include hardware, a method or process, or computer software on a computer-accessible medium.

BRIEF DESCRIPTION OF THE DRAWINGS

FIG. 3 illustrates an exemplary list of stream portions, consistent with some embodiments of the present disclosure.

DETAILED DESCRIPTION

Figure 1:
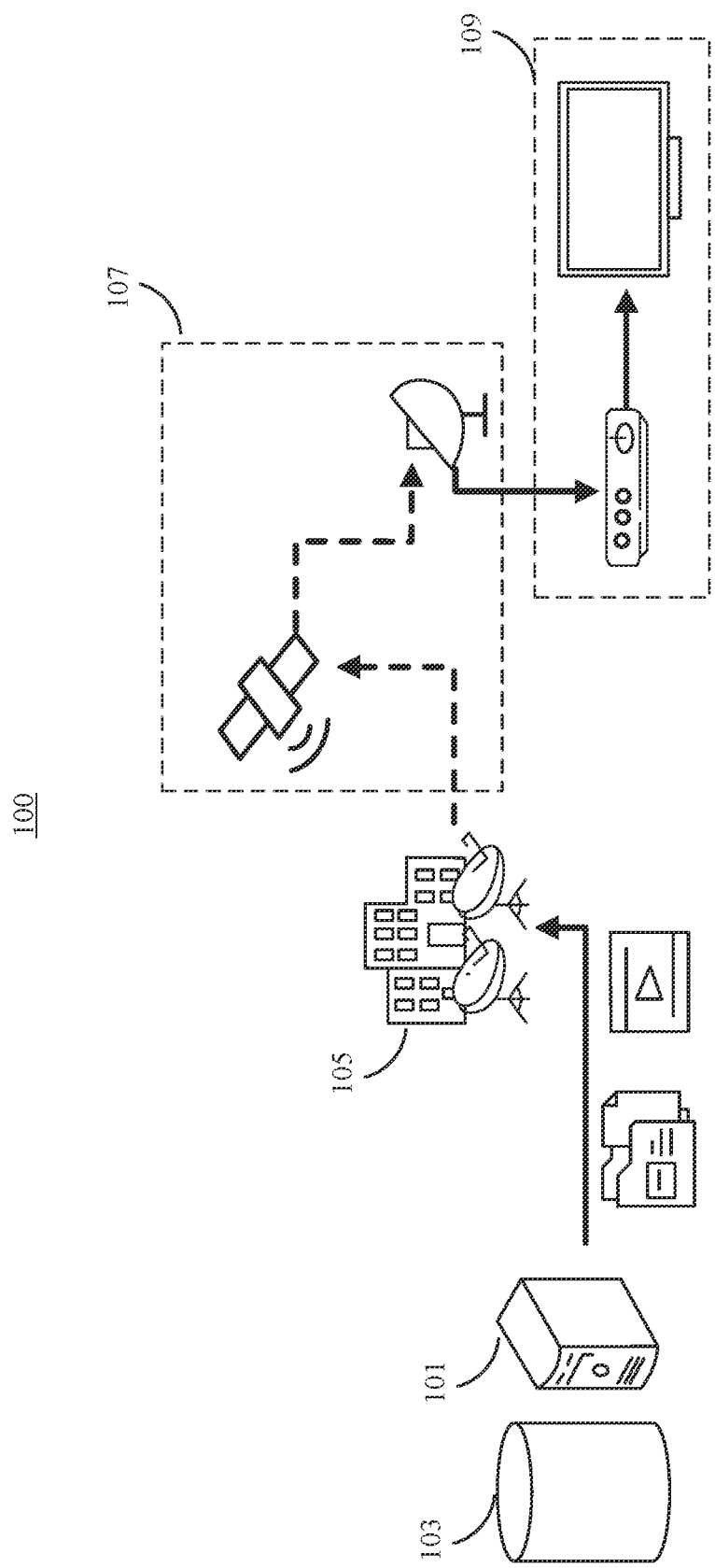
FIG. 1 is a block diagram of an exemplary computing architecture for managing presentation of stream portions on a client device, consistent with embodiments of the present disclosure.

Exemplary embodiments are described with reference to the accompanying drawings. The figures are not necessarily drawn to scale. While examples and features of disclosed principles are described herein, modifications, adaptations, and other implementations are possible without departing from the spirit and scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It should also be noted that as used herein and in the appended claims, the singular forms "a," "an," and "the" include plural references unless the context clearly dictates otherwise.

In the following description, various working examples are provided for illustrative purposes. However, is to be understood the present disclosure may be practiced without one or more of these details.

Throughout, this disclosure mentions "disclosed embodiments," which refer to examples of inventive ideas, concepts, and/or manifestations described herein. Many related and unrelated embodiments are described throughout this disclosure. The fact that some "disclosed embodiments" are described as exhibiting a feature or characteristic does not mean that other disclosed embodiments necessarily share that feature or characteristic.

This disclosure is provided for the convenience of the reader to provide a basic understanding of a few exemplary embodiments and does not wholly define the breadth of the disclosure. This disclosure is not an extensive overview of all contemplated embodiments and is intended to neither identify key or critical elements of all embodiments nor to delineate the scope of any or all aspects. Its sole purpose is to present some features of one or more embodiments in a simplified form as a prelude to the more detailed description presented later. For convenience, the term "certain embodiments" or "exemplary embodiment" may be used herein to refer to a single embodiment or multiple embodiments of the disclosure.

Embodiments described herein may refer to a non-transitory computer readable medium containing instructions that when executed by at least one processor, cause the at least one processor to perform a method. Non-transitory computer readable mediums may be any medium capable of storing data in any memory in a way that may be read by any computing device with a processor to carry out methods or any other instructions stored in the memory. The non-transitory computer readable medium may be implemented as hardware, firmware, software, or any combination thereof. Moreover, the software may preferably be implemented as an application program tangibly embodied on a program storage unit or computer readable medium consisting of parts, or of certain devices and/or a combination of devices. The application program may be uploaded to, and executed by, a machine comprising any suitable architecture. Preferably, the machine may be implemented on a computer platform having hardware such as one or more central processing units ("CPUs"), a memory, and input/output interfaces. The computer platform may also include an operating system and microinstruction code. The various processes and functions described in this disclosure may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium may be any computer readable medium except for a transitory propagating signal.

The memory may include any mechanism for storing electronic data or instructions, including Random Access Memory (RAM), a Read-Only Memory (ROM), a hard disk, an optical disk, a magnetic medium, a flash memory, other permanent, fixed, volatile or non-volatile memory. The memory may include one or more separate storage devices collocated or disbursed, capable of storing data structures, instructions, or any other data. The memory may further include a memory portion containing instructions for the processor to execute. The memory may also be used as a working scratch pad for the processors or as a temporary storage.

Some embodiments may involve at least one processor. A processor may be any physical device or group of devices having electric circuitry that performs a logic operation on input or inputs. For example, the at least one processor may include one or more integrated circuits (IC), including application-specific integrated circuit (ASIC), microchips, microcontrollers, microprocessors, all or part of a central processing unit (CPU), graphics processing unit (GPU), digital signal processor (DSP), field-programmable gate array (FPGA), server, virtual server, or other circuits suitable for executing instructions or performing logic operations. The instructions executed by at least one processor may, for example, be pre-loaded into a memory integrated with or embedded into the controller or may be stored in a separate memory.

In some embodiments, the at least one processor may include more than one processor. Each processor may have a similar construction, or the processors may be of differing constructions that are electrically connected or disconnected from each other. For example, the processors may be separate circuits or integrated in a single circuit. When more than one processor is used, the processors may be configured to operate independently or collaboratively. The processors may be coupled electrically, magnetically, optically, acoustically, mechanically or by other means that permit them to interact.

Consistent with the present disclosure, disclosed embodiments may involve a network for communications between the different subsystems of the system. A network may constitute any type of physical or wireless computer networking arrangement used to exchange data. For example, a network may be the Internet, a private data network, a virtual private network using a public network, a Wi-Fi network, a LAN or WAN network, and/or other suitable connections that may enable information exchange among various components of the system. In some embodiments, a network may include one or more physical links used to exchange data, such as Ethernet, coaxial cables, twisted pair cables, fiber optics, or any other suitable physical medium for exchanging data. A network may also include a public switched telephone network ("PSTN") and/or a wireless cellular network. A network may be a secured network or unsecured network. In other embodiments, one or more components of the system may communicate directly through a dedicated communication network. Direct communications may use any suitable technologies, including, for example, BLUETOOTH™, BLUETOOTH LE™ (BLE), Wi-Fi, near field communications (NFC), or other suitable communication methods that provide a medium for exchanging data and/or information between separate entities.

In some embodiments, machine learning algorithms may be trained using training examples, for example in the cases described below. Some non-limiting examples of such machine learning algorithms may include classification algorithms, data regressions algorithms, image segmentation algorithms, visual detection algorithms (such as object detectors, face detectors, person detectors, motion detectors, edge detectors, etc.), visual recognition algorithms (such as face recognition, person recognition, object recognition, etc.), speech recognition algorithms, mathematical embedding algorithms, natural language processing algorithms, support vector machines, random forests, nearest neighbors algorithms, deep learning algorithms, artificial neural network algorithms, convolutional neural network algorithms, recursive neural network algorithms, linear machine learning models, non-linear machine learning models, ensemble algorithms, and so forth. For example, a trained machine learning algorithm may comprise an inference model, such as a predictive model, a classification model, a regression model, a clustering model, a segmentation model, an artificial neural network (such as a deep neural network, a convolutional neural network, a recursive neural network, etc.), a random forest, a support vector machine, and so forth. In some examples, the training examples may include example inputs together with the desired outputs corresponding to the example inputs. Further, in some examples, training machine learning algorithms using the training examples may generate a trained machine learning algorithm, and the trained machine learning algorithm may be used to estimate outputs for inputs not included in the training examples. In some examples, engineers, scientists, processes and machines that train machine learning algorithms may further use validation examples and/or test examples. For example, validation examples and/or test examples may include example inputs together with the desired outputs corresponding to the example inputs, a trained machine learning algorithm and/or an intermediately trained machine learning algorithm may be used to estimate outputs for the example inputs of the validation examples and/or test examples, the estimated outputs may be compared to the corresponding desired outputs, and the trained machine learning algorithm and/or the intermediately trained machine learning algorithm may be evaluated based on a result of the comparison. In some examples, a machine learning algorithm may have parameters and hyper parameters, where the hyper parameters are set manually by a person or automatically by a process external to the machine learning algorithm (such as a hyper parameter search algorithm), and the parameters of the machine learning algorithm are set by the machine learning algorithm according to the training examples. In some implementations, the hyper-parameters are set according to the training examples and the validation examples, and the parameters are set according to the training examples and the selected hyper-parameters. The machine learning algorithms may be further retrained based on any output.

Certain embodiments disclosed herein may include computer-implemented methods comprising a series of steps. The computer-implemented methods may be implemented by one or more computer devices, which may include one or more processors as described above, configured to manage presentation of stream portions (e.g., movie content, television content, user-created video content, advertisement content, informational content, etc.) on a client device. The computing device and/or the client device may be one or more set-top boxes (STB), dedicated multimedia devices (e.g., Roku™, Apple TV™, Google Chromecast™, or Amazon Fire TV™, among others), smart televisions, mobile devices, desktops, laptops, tablets, or any other devices capable of rendering, projecting, or processing multimedia. Such computing devices may include a display such as an LED display, augmented reality (AR), virtual reality (VR) display. However, the computing device and/or the client device may also be implemented in a computing system that includes a back-end component (e.g., such as a data server), or that includes a middleware component (e.g., an application server), or that includes a front-end component (e.g., a client device having a graphical user interface or a Web browser through which a user can interact with an implementation of the systems and techniques described here), or any combination of such back-end, middleware, or front-end components. The components of the system and/or the client device can be interconnected by any form or medium of digital data communication (e.g., a communication network). Examples of communication networks include a local area network ("LAN"), a wide area network ("WAN"), and the Internet. The computing system can include clients and servers. A client and server are generally remote from each other and typically interact through a communication network. The relationship of client and server arises by virtue of computer programs running on the respective computers and having a client-server relationship to each other.

For example, FIG. 1 is a block diagram of an exemplary computing architecture 100 that may be used in connection with various disclosed embodiments. It is to be understood, however, that the systems and methods used to perform the steps disclosed herein may include all, some, more, or none of the subsystems shown. The exemplary computing architecture 100 of FIG. 1 includes a server 101, a database 103, a content distributor 105, a broadcast network 107, and a client device 109. Server 101 may include one or more computing systems configured to perform data or multimedia processing consistent with the present disclosure for presentation on client device 109. Server 101 may receive data or multimedia from one or more sources, and may subsequently make data or multimedia available to content distributor 105 upon a request, at a predetermined schedule, or in any other suitable manner. In some embodiments, for example, server 101 may comprise a headend facility for receiving multimedia (e.g., cable television broadcasts) for distribution to a local region.

Server 101 may have access to one or more databases, such as database 103, for storing multimedia or other data. The database may include one or more computing devices configured with appropriate software to perform operations consistent with providing server 101 data for performing transactions with content distributor 105. The database may include, for example, object storage databases for storing multimedia content, such as Amazon S3™, Microsoft Azure Blob Storage™, and Rackspace Files™, as well as relational or non-relational databases for other data storage, such as Oracle™, Sybase™, Dynamo™ DB, Hadoop™ sequence files, HBase™, or Cassandra™, and/or any other suitable databases depending on the specific application or context. The database may include components (e.g., a database management system, a database server, etc.) configured to receive and process requests for data stored in memory devices of the database(s) and to provide data from the database(s). The database may be included in, or be otherwise related to, server 101. For example, elements of the database may be embodied in one or more non-transitory media forming part of server 101.

Content distributor 105 may be any entity or system for disseminating multimedia. Content distributor 105 may comprise, for example, a direct-to-home (DTH) service provider, a digital-terrestrial-television (DTT) service provider, a Television receive-only (TVRO) service provider, a cable television service provider, an over-the-air service provider, or any other cable, broadcast, or satellite platform. Although the present disclosure will be made in reference to a broadcast environment, it is to be understood that some embodiments may include services provided directly to viewers using, for example, the Internet. Examples include over-the-top (OTT) media services, video-on-demand (SVoD) media services, and streaming services.

Broadcast network 107 may be any type of network configured to allow a broadcaster (such as content distributor 105) to broadcast information to a receiver (such as client device 109) through one or more broadcast channels. For example, broadcast network 107 may be any type of network (including an infrastructure) that provides frequency bands or other means of transmission for content to move from content distributor 105 to client device 109. In the exemplary embodiment depicted in FIG. 1, for example, broadcast network 107 may include a satellite transmitter for broadcasting information, as well as a satellite receiver for receiving the broadcast information. Other types of broadcast networks may be used, however, as would be appreciated by those having ordinary skill in the art.

Client device 109 may include a content receiver for receiving data from content distributor 105 transmitted through broadcast network 107, such as a set-top box (STB), a set-top unit (STU), a customer premises equipment (CPE), or any other receiving device. Client device 109 may also include a display for presenting the content received from content distributor 105, such as a television, a monitor, a tablet, a smartphone, or any other display device. In some embodiments, client device 109 may comprise multiple content receivers connected to a single display device, or a single content receiver connected to multiple display devices, or multiple content receivers connected to multiple display devices, as the situation may be. Furthermore, client device 109 may include one or more computing devices as described in more detail in connection with FIG. 2 for performing the functions described below. In some embodiments, however, the one or more computing devices may be separate from client device 109. Additionally or alternatively, client device 109 may include at least one processor configured to perform one or more operations consistent with disclosed embodiments. Client device 109, for example, may be configured to execute software operations that allow client device 109 to communicate with content distributors 105 over broadcast network 107 (or any other network) and generate and display content in interfaces via display devices included in client device 109. For example, client device 109 may utilize its display to output content received from content distributor 105.

It is to be understood that the configuration and boundaries of the functional building blocks of system 100 have been defined herein for the convenience of the description. Alternative boundaries can be defined so long as the specified functions and relationships thereof are appropriately performed. Alternatives (including equivalents, extensions, variations, deviations, etc., of those described herein) will be apparent. Such alternatives fall within the scope and spirit of the disclosed embodiments.

Figure 2:
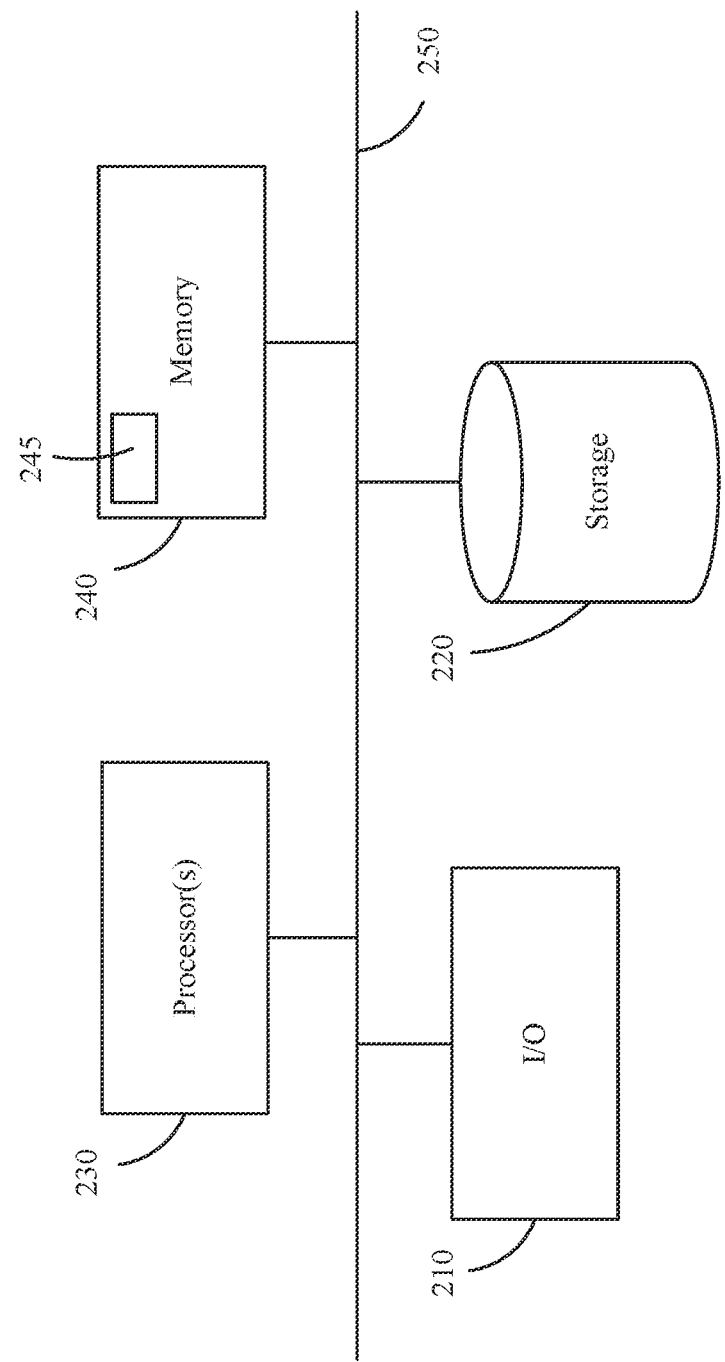
FIG. 2 is a block diagram of an exemplary computing device which may be employed in connection with embodiments of the present disclosure.

FIG. 2 is a block diagram of an example computing device 200 for managing presentation of broadcast portions, consistent with embodiments of the present disclosure. Computing device 200 may be used in connection with the implementation of the example system of FIG. 1. It is to be understood that in some embodiments the computing device and/or the client device may comprise multiple subsystems for performing the steps described herein.

As shown in FIG. 2, computing device 200 may include processor(s) 230, such as, for example, one or more central processing units (CPU), microprocessors or the like. In some embodiments, processor(s) 230 may include, or may be a component of, a larger processing unit implemented with one or more processors. The one or more processors may be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that can perform calculations or other manipulations of information.

As further shown in FIG. 2, processor(s) 230 may be communicatively connected via a bus or network 250 to a memory 240. Bus or network 250 may be adapted to communicate data and other forms of information. Memory 240 may include a memory portion 245 that contains instructions that when executed by the processor(s) 230, perform the operations and methods described in more detail herein. Memory 240 may also be used as a working memory for processor(s) 230, a temporary storage, and other memory or storage roles, as the case may be. By way of example, memory 240 may be a volatile memory such as, but not limited to, random access memory (RAM), or non-volatile memory (NVM), such as, but not limited to, flash memory.

Processor(s) 230 may also be communicatively connected via bus or network 250 to one or more I/O device 210. I/O device 210 may include any type of input and/or output device or periphery. I/O device 210 may include one or more network interface cards, APIs, data ports, and/or other components for supporting connectivity with processor(s) 230 via network 250.

As further shown in FIG. 2, processor(s) 230 and the other components (210, 240) of computing device 200 may be communicatively connected to a database or storage device 220. Storage device 220 may electronically store a collection of data in an organized format, structure, or file. Storage device 220 may include a database management system to facilitate data storage and retrieval. While illustrated in FIG. 2 as a single device, it is to be understood that storage device 220 may include multiple devices either collocated or distributed. In some embodiments, storage device 220 may be implemented on a remote network, such as a cloud storage.

Processor(s) 230 and/or memory 240 may also include machine-readable media for storing software or sets of instructions. "Software" as used herein refers broadly to any type of instructions, whether referred to as software, firmware, middleware, microcode, hardware description language, or otherwise. Instructions may include code (e.g., in source code format, binary code format, executable code format, or any other suitable format of code). The instructions, when executed by the one or more processors 230, may cause the processor(s) to perform the various operations and functions described in further detail herein.

Implementations of computing device 200 are not limited to the example embodiment shown in FIG. 2. The number and arrangement of components (210, 220, 230, 240) may be modified and rearranged. Further, while not shown in FIG. 2, computing device 200 may be in electronic communication with other network(s), including the Internet, a local area network, a wide area network, a metro area network, and other networks capable of enabling communication between the elements of the computing architecture. Also, computing device 200 may retrieve data or other information described herein from any source, including storage device 220 as well as from network(s) or other database(s). Such data or other information include media content for presentation to the user.

The disclosed computer-implemented steps may include steps for managing presentation of stream portions on a client device, consistent with some disclosed embodiments. A "stream portion," as used herein, may refer to a portion of or an entire stream received from a content service provider. In certain embodiments, the stream portions may be viewed through the use of a display (e.g., an LCD display, virtual reality display, or augmented reality display), as described above. It should be noted, however, that the disclosed embodiments are not limited to video, but may rather be used in conjunction with any desirable streaming content, such as audio, images, text, graphics, symbols, a combination thereof, or any other content able to be processed by the computing device. The stream portions may have a time length that may be the same or different between two or more stream portions, and the time length may be static or may vary through time or based on a variable.

"Presentation" of a stream portion, as used herein, may refer to the reproduction of any portion of a stream portion, such as sound and/or visuals associated with the stream portion. For example, a client device may be equipped with a display and/or an audio component for reproducing video and/or audio associated with the stream portion. The computing device may be configured to request a stream portion from the content service provider, the client device's memory, a database, or any other source of content, and to present the stream portions as a sequence of two or more stream portions. A stream portion (e.g., an advertisement) may be presented as a result of a marker in a currently viewed broadcast channel stream. For example, the currently viewed channel stream may be "conditioned" to include one or more digital program insertions, such as one or more SCTE-35 messages. A first marker in the currently viewed channel stream may be used to initiate the presentation of the stream portion. Following the presentation of the stream portion, a second marker may be used to resume the presentation of the currently viewed broadcast channel stream.

In some embodiments, the computing device may be configured to request a first stream portion, and while the first stream portion is being presented, request a second stream portion. The computing device may be configured to present multiple stream portions in a continuous fashion to provide an uninterrupted experience for a user viewing the video stream. In some embodiments, stream portions of one type may be viewed in between stream portions of another type. For example, between presentation of stream portions associated with a live sports broadcast, the computing device may present stream portions associated with advertisements, notices, warnings, displays, or any other content desired to be viewed between the live sports broadcast.

Presentation of stream portions may be managed by controlling any aspect of the reproduction of one or more stream portions, such as order, speed, duration, volume, overlays, opacity, requests, bandwidth, or any other characteristic associated with the presentation of the one or more stream portions. For example, managing presentation of two stream portions may include determining which of the two stream portions should play first, whether any actions or process should be performed in between presentation of the two stream portions (e.g., whether to change channels), whether to skip any of the two stream portions (e.g., as a result of pressing a skip button or the like), or any other aspect of the presentation of the two stream portions. Further, one type of stream portion may be presented in between presentation of another type of stream portion. As noted above, for example, an advertisement may be presented in between presentation of two or more stream portion associated with a live sports broadcast or any other content.

The disclosed computer-implemented steps may include receiving a list of stream portions associated with a plurality of stream portions, consistent with some disclosed embodiments. A list of stream portions, as used herein, may refer to any data containing information associated with one or more stream portions, the presentation of which is desired. In some embodiments, a list of stream portions may include a plurality of priorities associated with the plurality of stream portions, and which may represent the desirability of presentation of a stream portion in relation to other stream portions in the list. For example, a list of stream portions may be sequential, where the most desirable stream portion for presentation is the first stream portion in the list, and the second most desirable stream portion for presentation is the second stream portion in the list, and so forth. However, any other desired priority order may be used. For example, a list of stream portions may be defined such that several stream portions share a priority level, and a stream portion may be selected from among other stream portions having the same priority value based on a predefined rule, as a result of an input, randomly, or through any other process of selecting one item from a plurality of items. As a further example, the list of stream portions may change through time, or as a result of an input, as a result of change in content currently being streamed, as a result of change in geolocation, or as a result in change of any other context. As another example, a list of stream portions may be assigned based on one or more rules or variables, such as based on one or more user characteristics, randomly from a selection of multiple priority lists, as a result of an administrator or user preference, randomly, or through any other suitable process of assigning stream portions based on information received or computed by the system. In some embodiments, however, after receiving the stream portions in the list of stream portions, the computing device and/or the client device may ignore a priority defined in the list of stream portions. For example, when the highest priority stream portion is not stored in memory, the computing device and/or the client device may decide to present a lower priority stream portion or another stream portion in memory. A list of stream portions may be expressed in any manner suitable for communication between the content provider, the computing device, and/or the client device, such as a table, a JavaScript Object Notation (JSON) file, an Extensible Markup Language (XML) file, a comma-separated values (CSV) file, a Yet Another Multicolumn Layout (YAML) file, a Protocol Buffers (Protobuf) file, or any other suitable format for storing and transmitting information. In some embodiments, the list of stream portions may change as it is transmitted from one subsystem of the system to another. For example, the content provider may transmit a plurality of stream portion lists to the computing device, and the computing device may select and/or alter the stream portion lists before transmission to the client device (as noted above, however, it is to be understood that in some embodiments the computing device and the client device may be the same). A list of stream portions may be received at any suitable time, such as a specific time of day, at periodic time intervals, on specific days, as a result of a user or system action, a combination thereof, or at any other time. For example, a list of stream portions may be received at 9 AM each day, every thirty or sixty minutes, every Monday, upon a refresh action by the user, or upon start or re-start of the computing device, client device, or application. Furthermore, an entire list of stream portions or only a portion thereof may be received at a time. For example, a new list of stream portions may be received at 9 AM each day, and new portions of a list of stream portions may be received every thirty minutes thereafter, or a new full list of stream portions may be received every thirty minutes.

A priority value may be any data indicating the desirability, ranking, or hierarchy, or the like, of presentation associated with one or more stream portions in the list of stream portions. A priority value may be represented in any suitable format for processing by the computing device, and in some embodiments may be static or may change based on one or more variables, such as time, geolocation, user characteristic, current broadcast, administrator or user input, or any other context. A priority value may be expressed as any desired data type, such as a number, a character, a string, a Boolean, a logical operator, or any other suitable format of information.

For example, in some embodiments, a priority value may be associated with one or more numeric values. In such embodiments, the numeric value associated with the priority value may represent a ranking of the desirability of presentation of stream portions having a higher or lower number value. As a non-limiting example, a first stream portion with a priority value of "1" may be ranked higher than a second stream portion with a priority value of "2," and the computing device may subsequently cause presentation of the first stream portion instead of the second stream portion when required to choose between presenting the first stream portion and the second stream portion (e.g., as a result of limited time, memory, resources, or bandwidth, or as a result of any other context necessitating presentation of fewer than all possible stream portions). In some embodiments, however, the ranking between the numeric values may be in a reverse order, wherein a priority value of "2" may be ranked higher than a priority value of "1," or the ranking may be based on any other desired rule or order.

FIG. 3 illustrates an exemplary list of stream portions, consistent with some embodiments of the present disclosure. In FIG. 3, a list of stream portions including stream portions associated with advertisements in an table is depicted. As noted above, however, the list of stream portions may be associated with any other type of content capable of being processed by the computing device. Further, while the list of stream portions in FIG. 3 is depicted in a table format, it is to be understood that any other suitable data format may be used as discussed above. As shown in FIG. 3, the list of stream portions includes six stream portions, although any number of stream portions may be included, and any other desired priority structure or order may be implemented. As shown in FIG. 3, the list of stream portions may include information associated with each stream portion to identify and retrieve each stream portion from a channel, such as an identification number for uniquely identifying the stream portion ("Advert ID" column 301), a channel in which to cause presentation of the stream portion ("Channel ID" column 303), a starting time of the stream portion in the stream ("Start Time" column 305), and a time duration of the stream portion after the starting time ("Duration (sec)" column 307). Other information for identifying and retrieving a stream portion may be implemented, however, and the depiction in FIG. 3 is exemplary only. As further shown in FIG. 3, the list of stream portions may include auxiliary information that may be used to manage the storage and/or presentation of stream portions ("Auxiliary Information" column 309). For example, auxiliary information may include a group that may be used to represent similar stream portions ("Group"), a region identification number associated with a location ("Region"), a priority value representing a relative importance of presentation ("Priority"), and a name of the stream portion ("Advert_Name"). It is to be understood that all, some, none, or additional information may be included in a list of stream portions, and the content may depend on the specific application and/or video content desired for presentation.

In some embodiments, a priority value may be associated with one or more characteristics of a user associated with the client device. The user characteristic may represent any attribute associated with the user, such as geolocation, age, gender, education, occupation, language, income, travel history, preferences, viewing history, or a combination thereof. In such embodiments, the priority value may be based on one or more user characteristics, and it may change through time if the user characteristic changes. For example, in embodiments where a priority value is associated with a user's geolocation, a priority value associated with a stream portion may increase when the user is within a radius of a specified location, and the priority value may decrease when the user is outside the radius of the specified location. Consequently, the computing device may determine that it is more desirable to present the stream portion when the user is within the radius of the specified location, and it may determine that it is less desirable to present the stream portion when the user is outside the radius of the specified location. It is to be understood, however, that any other user characteristic and/or rule may be used to make this determination, as noted above.

The computer-implemented steps may further include determining a first set of high-priority stream portions from the first plurality of stream portions, consistent with some disclosed embodiments. "High-priority" stream portions, as used herein, may refer to one or more stream portions, the presentation of which is desired over one or more other stream portions. The computing device and/or the client device may determine that a stream portion is "high-priority" based on any relationship between the available stream portions, such as predetermined priority values, one or more user characteristics, or any other factor. Although certain examples are provided herein to determine whether a stream portion is high-priority, it is to be understood that the determination may vary depending on the specific application or context. As one illustrative example, in embodiments where priority values are associated with predetermined numeric values (e.g., values based on the advertisement expenditure by the advertising company), such as "1," "2", or "3," a stream portion having a priority value of "1" may be deemed to be higher priority than stream portions having priority values of "2" or "3." As another example, priority may be based on the presentation of the stream segments. For example, a stream portion that would otherwise have a lower priority (e.g., "2") may be deemed to be higher priority than another stream segment portion having an otherwise higher priority (e.g., "1"), due to the fact that the otherwise higher priority stream portion was presented last. As yet another example, priority may be based on one or more user's characteristics. For example, in embodiments where priority values are associated with a user's geolocation, stream portions may have priority values associated with a user's geolocation, and the priority may be based on a distance from the user. In such embodiments, a stream portion having a target location closer to the user's geolocation may be deemed to be higher priority than stream portions having target locations farther from the user's geolocation. As another non-limiting example, stream portions may have priority values associated with a user's age. In such embodiments, a stream portion having a target audience age closer to the user's age may be deemed to be higher priority than a stream portion having a target age farther from the user's age. It is to be understood, however, that the determination process may vary depending on the type of priority values used, the priority rules, or any other information associated with the stream portions. The above-described scenarios are provided for illustration purposes only and are not intended to be exhaustive.

The computer-implemented steps may further include retrieving from a channel at least one portion of the first set of high-priority stream portions, consistent with some disclosed embodiments. A "channel," as used herein, may refer to a designated route through which one or more stream portions may be transmitted, such as an electromagnetic frequency or wavelength (e.g., a specific radio frequency), a television station, a radio station, a satellite station, or any other suitable medium for transmitting content. The high-priority stream portion may be retrieved from the channel prior to presentation through any appropriate means, such as by retrieving it by using a channel identifier specified in the list of stream portions (as shown in FIG. 3), although other suitable methods will be apparent to those having ordinary skill in the art. In this manner, rather than the system using separate data streams for the same stream portions across multiple computing devices and/or client devices, it may provide a single live stream from which multiple computing devices and/or client devices may scrape or otherwise acquire stream portions (e.g., advertisements) and store them in memory prior to presentation, as further detailed below. This may lead to enhanced efficiency and savings. In some embodiments, portions of high-priority stream portions may be retrieved in a particular order. For example, a first portion to be presented before a second portion may be retrieved before retrieving the second portion. However, in some embodiments, the second portion may be retrieved before retrieving the first portion. Further, in some embodiments, portions of one high-priority stream portion may be retrieved in between portions of another stream portion or any other content. It is to be understood that, in some embodiments, a portion of a high-priority stream portion may be retrieved from sources other than a channel, such as one or more edge computing systems, cloud computing systems, servers, client devices, memories, databases, a combination thereof, or any other suitable source of content as described above.

The computer-implemented steps may further include storing in a memory the retrieved portion of the first set of high-priority stream portions, consistent with some disclosed embodiments. A set of high-priority stream portions may be stored in any suitable memory, which, consistent with the definition above, may include any mechanism capable of storing electronic data, such as a Random Access Memory (RAM), a Read-Only Memory (ROM), a hard disk, an optical disk, a magnetic medium, a flash memory, other permanent, fixed, or volatile or non-volatile memory. It is to be understood that the memory may be integrated with the computing device and/or the client device, or it may be a separate component (e.g., a database). In some embodiments, each stream portion in a set of high-priority stream portions may be stored across multiple memories, either in whole or in part, and may be subsequently arranged to recreate the entire stream portion during presentation.

The computer-implemented steps may further include receiving a second or subsequent list of stream portions containing a second or subsequent plurality of stream portions, consistent with some disclosed embodiments. The second or subsequent list of stream portions may be the same or similar to the list of stream portions discussed above. In some embodiments, however, they may have different formats. For example, a first list of stream portions and a second list of stream portions may both be in JSON format, or the first list of stream portions may be in JSON format while the second list of stream portions may be in XML format, or vice versa. Further, two or more lists of stream portions may include the same, similar, or different information. For example, both the first and second lists of stream portions may include priority values associated with numerical values, or the first list of stream portions may include priority values associated with numerical values while the second list of stream portions may include priority values associated with user characteristics, or vice versa.

The computer-implemented steps may further include determining a second set of high-priority stream portions from the second plurality of stream portions and a first set of high-priority stream portions of a first list of stream portions, consistent with some disclosed embodiments. The second set of high-priority stream portions may be determined in the same or similar manner as the first set of high-priority stream portions, as described above. In some embodiments, however, the determination of the first set of high-priority stream portions may be performed in a different manner than the determination of the second set of high-priority stream portions. For example, in embodiments where the first and second list of stream portions are associated with different data (e.g., different types of priority values, different priority references, different priority rules, or any other differing information), the determination of the high-priority values in each list may be different to account for the difference in the data contained therein. As a non-limiting example, if the first and second list of stream portions includes priority values associated with numerical values, but the priority reference for the first list of stream portions is "4" while the priority reference for the second list of stream portions is "2," then a stream portion associated with a priority value of "3" may be determined to be a high-priority stream portion for the first list of stream portions but not for the second list of stream portions (or vice versa). A different determination process may also take place, for example, when the first list of stream portions is associated with a first type of priority values, such as numerical values, while the second list of stream portions is associated with a second type of priority values, such as a user's geolocation or another user characteristic. As would be appreciated by those having ordinary skill in the art, other processes for determining high-priority stream portions may be implemented based on the information present in the first and second list of stream portions.

The computer-implemented steps may further include determining whether any stream portions in the stored portion of the first set of high-priority stream portions are not in the second set of high-priority stream portions, consistent with some disclosed embodiments. The determination of whether a stored stream portion is not in the second set of high-priority stream portions may be performed using any information associated with the stored stream portion, such as a name identifier, an identification number, a group number, a region identifier, a channel identifier, a time identifier, or any other information associated with the stream portion. Any suitable process may be employed for the determination process, including using one or more instructions, signals, loops, logic tables, logical rules, logical combination rule, logical templates, or any operations suitable for comparing data.

The computer-implemented steps may further include deleting from the memory any stream portions in the stored portion of the first set of high-priority stream portions that are not in the second set of high-priority stream portions, consistent with some disclosed embodiments. "Deleting," as used herein, may refer to processes or procedures of erasing, removing, cancelling, destroying, nullifying, negating, or any manner of neutralizing the content of a stream portion. In some embodiments, deleting a stream portion from memory may include erasing it from one memory (e.g., in a client device) while preserving it in another memory storage location (e.g., in a cloud server). Further, a portion of a stream portion may be deleted while another portion of the same stream portion may be preserved.

The computer-implemented steps may further include determining whether any stream portions in the second set of high-priority stream portions are not stored in the memory, consistent with some disclosed embodiments. The determination of whether a stream portion in the second set of high-priority stream portions is not stored in the memory may be performed using any information associated with the stored stream portion, such as a name identifier, an identification number, a group number, a region identifier, a channel identifier, a time identifier, or any other information associated with the stream portion, similar to the description above. Further, any suitable process may be employed for the determination process, including using one or more instructions, signals, logic tables, logical rules, logical combination rule, logical templates, or any operations suitable for comparing data, as described above.

The computer-implemented steps may further include retrieving from the channel at least one portion of any stream portions in the second set of high-priority stream portions that are not stored in the memory, consistent with some disclosed embodiments. Retrieving a portion of a stream portion in the second set of high-priority stream portions from the network may be performed in the same or similar manner as retrieving a portion of a stream portions in the first set of high-priority stream portions, as described above. In some embodiments, one or more stream portions (or portions thereof) associated with the first set of high-priority stream portions may be retrieved from the same or different content provider as the second set of high-priority stream portions. For example, a first stream portion associated with the first set of high-priority stream portions and a second stream portion associated with the second set of high-priority stream portions may both be retrieved from the channel, or the first stream portion associated with the first set of high-priority stream portions may be retrieved from a first channel while the second stream portion associated with the second set of high-priority stream portions may be retrieved from a second channel.

The computer-implemented steps may further include storing in the memory the retrieved portion of any stream portions in the second set of high-priority stream portions that are not stored in the memory, consistent with some disclosed embodiments. A stream portion in the second set of high-priority stream portions may be stored in the same or similar manner as with the first set of high-priority stream portions, as described above. In some embodiments, one or more stream portions (or portions thereof) associated with the first set of high-priority stream portions may be stored in the same or different memory location as the second set of high-priority stream portions. For example, a first stream portion associated with the first set of high-priority stream portions and a second stream portion associated with the second set of high-priority stream portions may both be stored in local memory of the computing device and/or the client device, or the first stream portion associated with the first set of high-priority stream portions may be stored in local memory while the second stream portion associated with the second set of high-priority stream portions may be stored in the cloud or other remote database.

In some embodiments, at least one portion in the first list of stream portions may be associated with a first time window, and at least one portion in the second list of stream portions may be associated with a second time window. A "time window," as used herein, may refer to a particular time period at which to retrieve one or more stream portions from a broadcast channel, such as minutes, hours, or any other discrete period. For example, a time window may be thirty or sixty minutes starting at a particular time. A time window may be fixed, dynamic, or both. For example, a first window may be a predetermined duration, while the second window may change based on time, a received input, a change in a variable, a current broadcast, a particular stream portion or portion thereof, or any other dynamic information (or vice versa). The first time window and the second time window may be the same, similar, or different. As a non-limiting example, portions of first and second lists of stream portions may be associated with a time window that is thirty minutes in length. However, in some embodiments, the at least one portion in the first list of stream portions may be associated with a first time window that is thirty minutes in length, and the at least one portion in the second list of stream portions may be associated with a second time window that is sixty minutes in length. Any other discrete time period may be used as noted above, however, as would be appreciated by those having ordinary skill in the art.

In some embodiments, the first list of stream portions may be associated with a first plurality of client devices, and the second list of stream portions may be associated with a second plurality of client devices. Similarly, in some embodiments, a retrieved portion of a set of high-priority stream portions may comprise stream portions from two or more different pluralities of client devices. The first plurality of client devices and the second plurality of client devices may be the same, similar, or different. In some embodiments, stream portions may be grouped by a characteristic, such as region, language, target audience, broadcast source, affiliated companies, or any other attribute shared by the grouped stream portions. For example, a first group may be associated with prime time broadcasts, while a second group may be associated with matinee time broadcasts. However, in some embodiments, stream portions may be grouped manually, randomly, or using a rule.

For example, in FIG. 3, the exemplary list of stream portions depicted therein includes multiple stream portions, where each stream portion has a "Group" identifier. For example, the first two stream portions may belong to the same group ("1"), while the third stream portion may belong to a different group ("2"). A group in this context may be two or more channels in which the stream portion may be presented. For example, if group "1" indicates channels belonging to Viacom, and the MTV and Nickelodeon channels are both Viacom channels, then those segment portions having a group identifier of "1" (e.g., the first Coke advertisement) may be played in both the MTV and Nickelodeon channels.

In some embodiments, the computer-implemented steps may further include steps that are dependent on the channel to which the client device is currently connected. As a non-limiting example, in some embodiments, the computer-implemented steps may include requesting the first list of stream portions when the client device is connected to a first group of channels and/or requesting the second list of stream portions when the client device is connected to a second group of channels. Other operations or functions may be performed based on the currently connected channel, however, as would be understood by those having ordinary skill in the art, such as requesting additional related or unrelated content, user information or history, metadata associated with the currently connected channel or the user, previously retrieved information, logos or graphics associated with the channel, schedules or ratings, or any other data available to the system.

Figure 4:
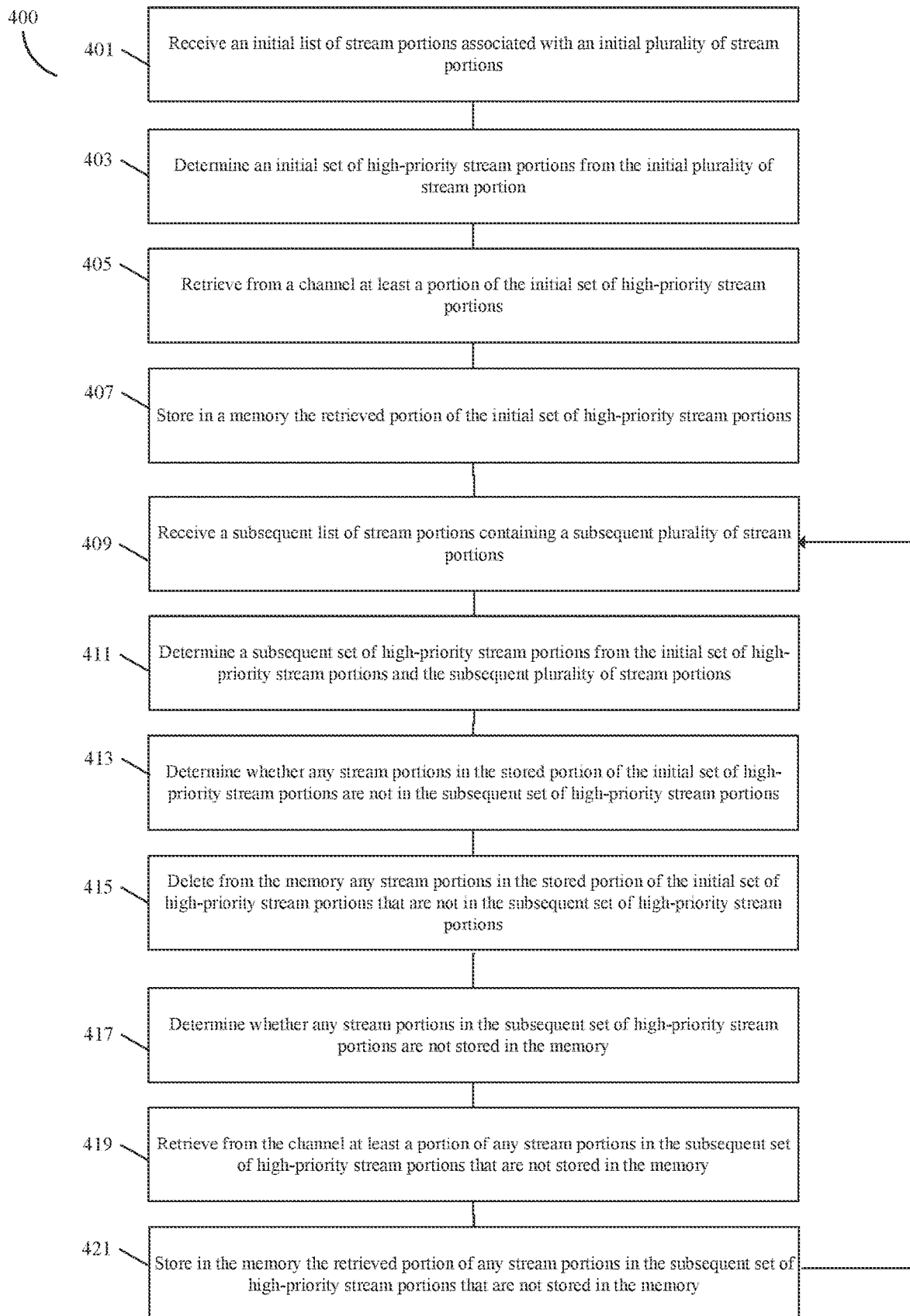
FIG. 4 illustrates a block diagram of an example process for managing storage of stream portions using a first and a second list of stream portions, consistent with some embodiments of the present disclosure.

FIG. 4 illustrates a block diagram of an example process 400 for managing storage of stream portions using a first and a second list of stream portions, consistent with some disclosed embodiments. While the block diagram may be described below in connection with certain implementation embodiments presented in other disclosure, those implementations are provided for illustrative purposes only, and are not intended to serve as a limitation on the block diagram. In some embodiments, the process 400 may be performed by at least one processor (e.g., the processing circuitry 230 in FIG. 2) of a computing device (e.g., the computing device 200 in FIG. 2) to perform operations or functions described herein. In some embodiments, some aspects of the process 400 may be implemented as software (e.g., program codes or instructions) that are stored in a memory (e.g., the memory portion 240 in FIG. 2) or a non-transitory computer-readable medium. In some embodiments, some aspects of the process 400 may be implemented as hardware (e.g., a specific-purpose circuit). In some embodiments, the process 400 may be implemented as a combination of software and hardware. It is to be understood that, in some alternative implementations, functions indicated in a block may occur out of the order noted in the figure, or additional blocks may be added, or depicted blocks may be omitted, without departing from the scope and spirit of the claimed invention. The same aspects noted above with respect to FIG. 4 are to be understood with respect to other block diagram figures presented herein.

As shown in FIG. 4, process 400 includes process blocks 401 to 421. At block 401, a computing device may receive an initial list of stream portions associated with an initial plurality of stream portions (e.g., a list of stream portions as shown in FIG. 3). At block 403, the computing device may electronically determine an initial set of high-priority stream portions from the initial plurality of stream portion. At block 405, the computing device may retrieve from a channel at least one portion of the initial set of high-priority stream portions. At block 407, the computing device may store in a memory the retrieved portion of the initial set of high-priority stream portions. At block 409, the computing device may receive a subsequent list of stream portions containing a subsequent plurality of stream portions. At block 411, the computing device may determine a subsequent set of high-priority stream portions from the initial set of high-priority stream portions and the subsequent plurality of stream portions. At block 413, the computing device may determine whether any stream portions in the stored portion of the initial set of high-priority stream portions are not in the subsequent set of high-priority stream portions. At block 415, the computing device may delete from the memory any stream portions in the stored portion of the initial set of high-priority stream portions that are not in the subsequent set of high-priority stream portions. At block 417, the computing device may determine whether any stream portions in the subsequent set of high-priority stream portions are not stored in the memory. At block 419, the computing device may retrieve from the channel at least one portion of any stream portions in the subsequent set of high-priority stream portions that are not stored in the memory. At block 421, the computing device may store in the memory the retrieved portion of any stream portions in the subsequent set of high-priority stream portions that are not stored in the memory. The process may subsequently loop back to block 419 upon completion for any future list of stream portions.

The computer-implemented steps may further include, upon receipt of a marker, retrieving from the memory a particular stream portion, consistent with some disclosed embodiments. A "marker," as used herein, may refer to any input or signal received by the computing device and/or client device indicating that at least one portion of a stream portion should be presented, such as an instruction, an activation, a user input, a voice command, a mouse click, a cursor hover, a mouseover, a button activation, a keyboard input, a motion, an interaction performed in virtual or augmented reality, a network or data packet, an electronic signal, an electromagnetic or magnetic signal, an optical signal, a mechanical signal, or any other data received by the computing device and/or the client device. For example, a marker may be based on a digital program insertion process, such as an SCTE-35 splice insert message, or it may be based on another predetermined protocol or message structure. In this context, the stream may be "conditioned" to allow for the marker of an insertion of a stream portion during presentation, thereby pausing a current stream to present the stream portion. A marker may also be used to marker the computing device to resume the previous stream upon completion of the presentation of the stream portion. In some embodiments, however, a marker may be created automatically, manually, randomly, or a combination thereof. For example, a marker may be generated or received at predetermined time intervals (e.g., every three minutes), or it may be generated manually by an administrator or content provider (e.g., during half-time in a sports broadcast).

The computer-implemented steps may further include presenting the particular stream portion to the client device, consistent with some disclosed embodiments. Consistent with the definition above, the particular stream portion may be presented by reproducing any portion of the particular stream portion, such as sound and/or visuals associated with it. For example, a client device may be equipped with a display and/or an audio component to cause the reproduction of a portion of the particular stream portion.

Figure 5:
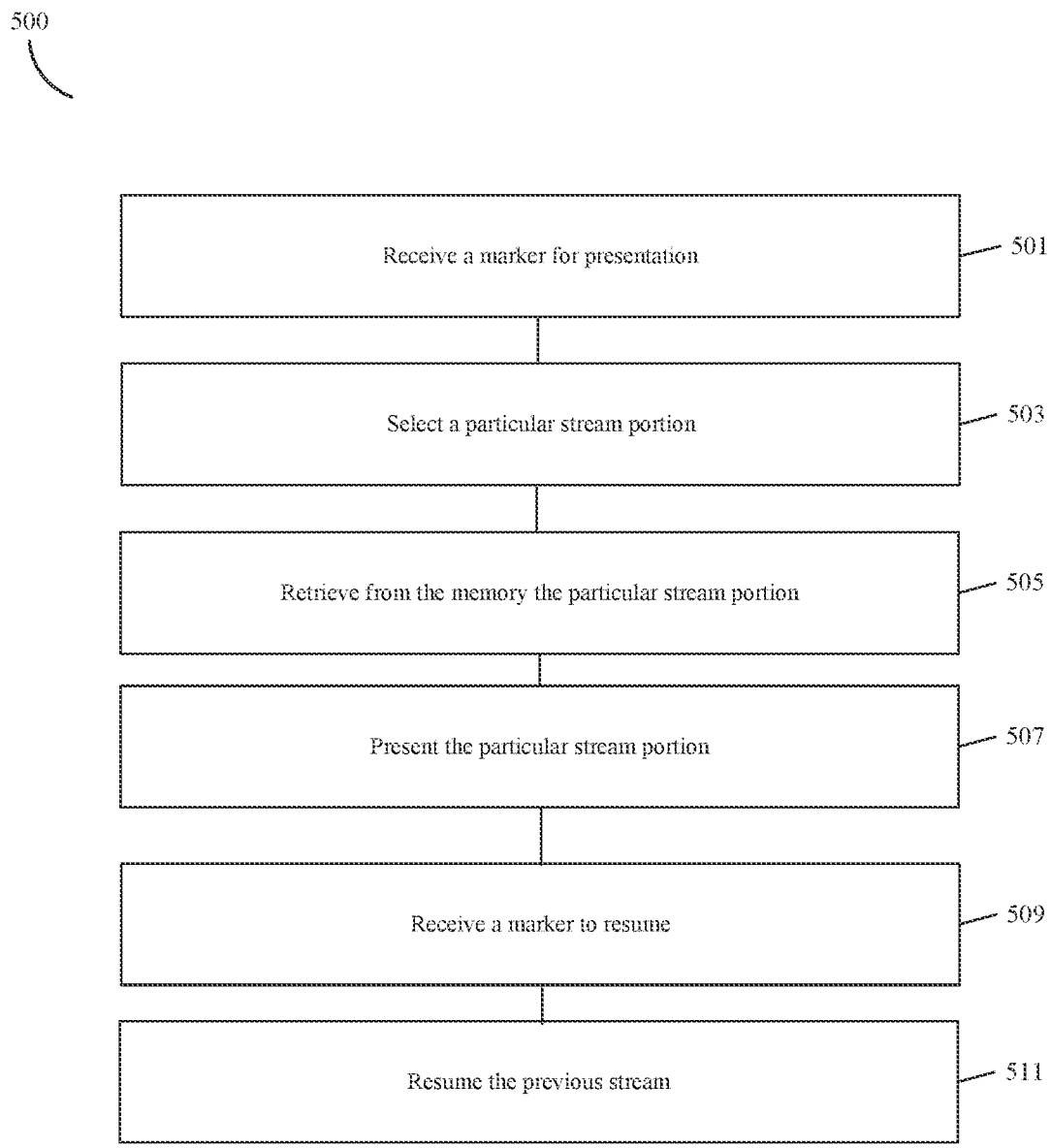
FIG. 5 illustrates a block diagram of an example process for managing presentation of stream portions upon receipt of a marker, consistent with some embodiments of the present disclosure.

FIG. 5 illustrates a block diagram of an example process 500 for managing presentation of stream portions upon receipt of a marker, consistent with some disclosed embodiments. As shown in FIG. 5, process 500 includes process blocks 501 to 511. At block 501, a computing device (e.g., the software and/or processing circuitry 230 in FIG. 2) may receive a marker, wherein the marker may indicate presentation of a stream portion. At block 503, the computing device may select a particular stream portion (e.g., by applying a custom filter based on any criteria, such as the criteria discussed above, including priorities, user information, or any other information). At block 505, the computing device may retrieve from the memory the particular stream portion. At block 507, the computing device may present the particular stream portion to the client device. At block 509, the computing device may receive a marker to resume the previous stream upon completion of the presentation of the particular stream portion. At block 511, the computing device may resume the previous stream.

The computer-implemented steps may further include determining whether the client device is attempting to connect from a first channel to a second channel during the presentation of the particular stream portion, consistent with some disclosed embodiments. In some embodiments, the computing device may determine that the client device is attempting to connect to a second channel based on an input received by the computing device, such as a user input, an administrator input, a periodic timer, a trigger, a command, or any other indication of change of the active channel. For example, in embodiments where the client device is a set-top box controlled by a remote control or an application, the computing device (which may be the same as the client device, as described above) may determine that the client device is attempting to connect to a second channel when the user presses a "next channel" button on the remote control or the application. In some embodiments, the computing device may determine that the client device is attempting to connect to a second channel when a criteria is met. For example, in embodiments where the client device automatically connects to a next channel upon the conclusion of a currently viewed broadcast or as the result of a timer or as a result of another criteria, the computing device may determine that the client device is attempting to connect to a second channel when that criteria is met (e.g., the currently viewed broadcast ends or the timer expires). Any other input or criteria may be used to determine whether a client device is attempting to connect from a first channel to a second channel, as would be understood by those having ordinary skill in the art.

The computer-implemented steps may further include preventing connection to the second channel during the presentation of the particular stream portion, consistent with some disclosed embodiments. The computing device may prevent connection to the second channel by stopping, delaying, overriding, negating, nullifying, or otherwise disabling execution of the channel change during presentation of at least one portion of the particular stream portion. For example, in embodiments where the stream portion has a predetermined duration of ninety seconds, the computing device may disable the execution of the channel change for ninety seconds. In situations where it may be desirable to prevent execution of the channel change during presentation of a set of one or more stream portions, however, the computing device may disable the execution of the channel change until the presentation of the set of stream portions, or it may allow execution of the channel change after a portion of the set of stream portions is presented, and may subsequently present a remaining portion of the set of stream portions.

Figure 6:
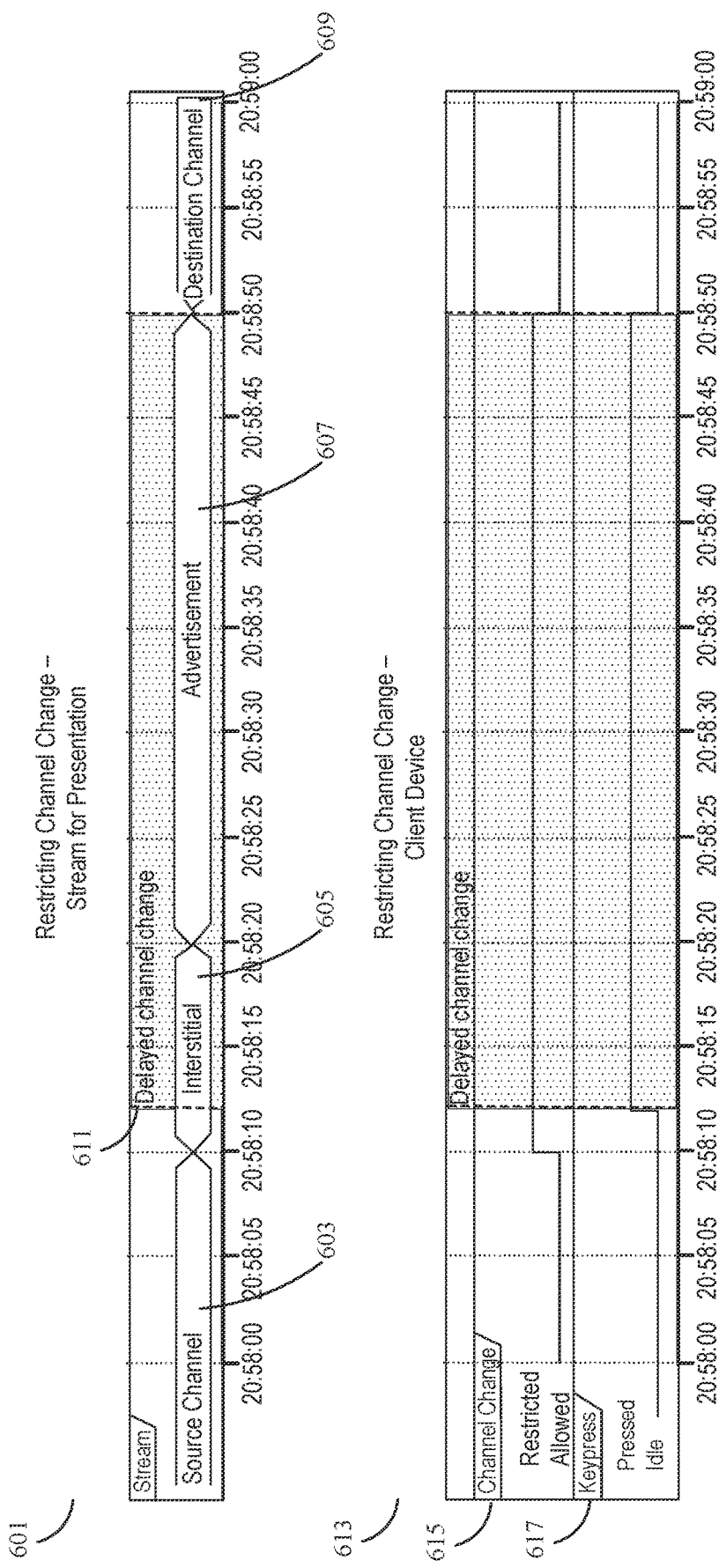
FIG. 6 illustrates an exemplary timing diagram for preventing connection to a second channel during the presentation of a particular stream portion, consistent with some embodiments of the present disclosure.

For example, FIG. 6 illustrates an exemplary timing diagram for preventing connection to a second channel during the presentation of a particular stream portion, consistent with some disclosed embodiments. In FIG. 6, two illustrative tables, tables 601 and 613, depicting a channel change restriction are shown. Table 601 illustrates streams that may be presented to a client device, such as client device 109 of FIG. 1, during a channel change restriction according to some enclosed embodiments. Table 613 illustrates the client device's operations during such a channel change restriction. As shown in table 601, a stream from a source or first channel, depicted as "Source Channel" 603, may be initially presented to the client device during viewing of that channel's content. As a result of a marker in the stream of source channel 603 at a particular time, such as time "20:58:10" shown in table 601, the client device may be presented with an interstitial overlay, depicted as "Interstitial" 605, followed by the presentation of a stream portion, denoted as "Advertisement" 607. Although the stream portion depicted in FIG. 6 is labeled "Advertisement," it is to be understood that other types of stream portions may be presented, as described above. Before presentation of "Interstitial" 607, channel change may be allowed, denoted as "Allowed" in "Channel Change" row 615 of table 613. Upon presentation of "Interstitial" 607, however, channel change may be restricted, denoted as "Restricted" in "Channel Change" row 615 of table 613. Accordingly, when the user attempts to initiate a channel change through the client device, such as through a button press, denoted as "Pressed" in "Keypress" row 617 of table 613, the channel change may be restricted, thereby preventing the client device from changing to another channel during the presentation of stream portion 607. The period of channel change restriction is denoted as "Delayed channel change" region 611 in tables 601 and 613. As a result of a marker in stream portion 607, such as time "20:58:50" shown in table 601, the client device may be presented with a stream from the channel to which the user intended to change, denoted as "Destination Channel" 609. In some circumstances, such as if there is the user does not initiate a channel change, "Source Channel" 603 and "Destination Channel" 609 may be the same. Because the presentation of stream portion 607 has concluded, a channel change operation from the client device may be allowed, denoted as "Allowed" in "Channel Change" row 615 in table 613.

In some embodiments, the computer-implemented steps may include presenting, for display on the device during the presentation of the particular stream portion, information associated with the second channel. Information associated with a channel may include any data or metadata related to the channel or its contents, such as the name of the channel, content available in the channel, content that was previously available in the channel or that will be available in the future, logos or other graphics associated with the channel or its content, ratings or reviews, schedules, or any other information capable of conveying to a user that the user has navigated to the second channel. For example, the name of the second and a banner associated with the second channel may be displayed. In this manner, the user may be aware that the channel change operation has been registered, although it has been prevented, during presentation of the stream portion.

In some embodiments, the computer-implemented steps may further include presenting a countdown timer indicating a remaining duration of the presentation. A countdown timer may be presented in any manner suitable for the stream portion, such as one or more numbers, digits, characters, strings, animations, graphics, videos, logos, or any other static or dynamic visual representation of the remaining duration of the presentation. For example, the countdown timer may be presented in a format of minutes, seconds, or both, such as "01:30" indicating that one minute and thirty seconds are left of the presentation of the stream portion. As another example, the countdown timer may be a circle or ring that becomes fuller as the stream portion is presented. In this manner, the user may know the remaining duration of presentation of the stream portion.

Figure 7:
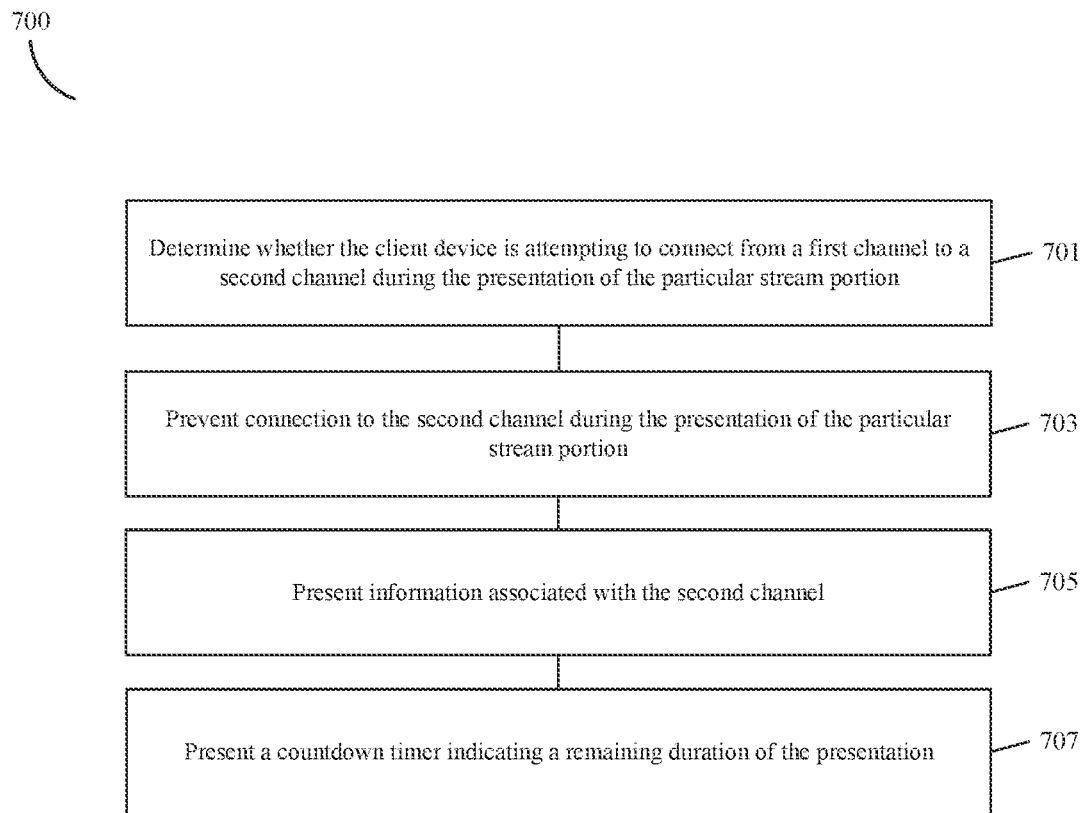
FIG. 7 illustrates a block diagram of an example process for managing presentation of stream portions to prevent connection to a second channel, consistent with some disclosed embodiments.

FIG. 7 illustrates a block diagram of an example process 700 for managing presentation of stream portions to prevent connection to a second channel, consistent with some disclosed embodiments. As shown in FIG. 7, process 700 includes process blocks 701 to 707. At block 701, a computing device (e.g., the software and/or processing circuitry 230 in FIG. 2) may determine whether the client device is attempting to connect from a first channel to a second channel during the presentation of the particular stream portion. At block 703, the computing device may prevent connection to the second channel during the presentation of the particular stream portion. At block 705, the computing device may present information associated with the second channel. At block 707, the computing device may present a countdown timer indicating a remaining duration of the presentation.

The block diagrams in the figures above illustrate the architecture, functionality, and operation of possible implementations of systems, methods, and computer hardware or software products according to various example embodiments of the present disclosure. In this regard, each block in a flowchart or block diagram may represent a module, segment, or portion of code, which includes one or more executable instructions for implementing the specified logical functions. It should be understood that in some alternative implementations, functions indicated in a block may occur out of order noted in the figures. For example, two blocks shown in succession may be executed or implemented substantially concurrently, or two blocks may sometimes be executed in reverse order, depending upon the functionality involved. Some blocks may also be omitted. It should also be understood that each block of the block diagrams, and combination of the blocks, may be implemented by special purpose hardware-based systems that perform the specified functions or acts, or by combinations of special purpose hardware and computer instructions.

It should be appreciated that the above-described methods and apparatus may be varied in many ways, including omitting or adding steps, changing the order of steps and the type of devices used. It should be appreciated that different features may be combined in different ways. In particular, not all the features shown above in a particular embodiment or implementation are necessary in every embodiment or implementation of the invention. Further combinations of the above features and implementations are also considered to be within the scope of some embodiments or implementations of the invention.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the implementations. It should be understood that the embodiments have been presented by way of example only, not limitation, and various changes in form and details may be made. Any portion of the apparatus and/or methods described herein may be combined in any combination, except mutually exclusive combinations. The implementations described herein can include various combinations and/or sub-combinations of the functions, components and/or features of the different implementations described.

Moreover, while illustrative embodiments have been described herein, the scope includes any and all embodiments having equivalent elements, modifications, omissions, combinations (e.g., of aspects across various embodiments), adaptations or alterations based on the present disclosure. The elements in the claims are to be interpreted broadly based on the language employed in the claims and not limited to examples described in the present specification or during the prosecution of the application. These examples are to be construed as non-exclusive. Further, the steps of the disclosed methods can be modified in any manner, including by reordering steps or inserting or deleting steps. It is intended, therefore, that the specification and examples be considered as exemplary only, with a true scope and spirit being indicated by the following claims and their full scope of equivalents.

What is claimed is:

1. A computer-implemented method for managing presentation of stream portions on a client device, the method comprising:

receiving a first list of stream portions associated with a first plurality of stream portions;

determining a first set of high-priority stream portions from the first plurality of stream portions;

retrieving from a channel at least one portion of the first set of high-priority stream portions;

storing in a memory the retrieved at least one portion of the first set of high-priority stream portions;

receiving a second list of stream portions containing a second plurality of stream portions;

determining a second set of high-priority stream portions from the first set of high-priority stream portions and the second plurality of stream portions;

determining whether one or more stream portions in the stored at least one portion of the first set of high-priority stream portions are not in the second set of high-priority stream portions;

deleting from the memory one or more stream portions in the stored at least one portion of the first set of high-priority stream portions that are not in the second set of high-priority stream portions;

determining whether one or more stream portions in the second set of high-priority stream portions are not stored in the memory;

retrieving from the channel at least one portion of one or more stream portions in the second set of high-priority stream portions that are not stored in the memory;

storing in the memory the retrieved portion of one or more stream portions in the second set of high-priority stream portions that are not stored in the memory;

upon receipt of a marker, retrieving from the memory a particular stream portion, wherein the marker indicates presentation of the particular stream portion;

presenting the particular stream portion to the client device; and receiving a marker to resume a previous stream upon completion of the particular stream portion.

2. The method of claim 1, wherein the first list of stream portions includes a first plurality of priority values, and the second list of stream portions includes a second plurality of priority values.

3. The method of claim 2, wherein the first plurality of priority values and the second plurality of priority values are associated with numeric values or one or more characteristics of a user associated with the client device.

4. The method of claim 1, wherein at least one portion in the first list of stream portions is associated with a first time window, and at least one portion in the second list of stream portions is associated with a second time window.

5. The method of claim 1, wherein a first set of stream portions in the first plurality of stream portions or second plurality of stream portions is associated with a first plurality of client devices, and a second set of stream portions in the first plurality of stream portions or second plurality of stream portions is associated with a second plurality of client devices.

6. The method of claim 1, further comprising:
requesting the first list of stream portions when the client device is connected to a first group of channels; and
requesting the second list of stream portions when the client device is connected to a second group of channels.

7. The method of claim 1, further comprising:
determining whether the client device is attempting to connect from a first channel to a second channel during the presentation of the particular stream portion; and
preventing connection to the second channel during the presentation of the particular stream portion.

8. The method of claim 7, further comprising:
presenting to the client device information associated with the second channel.

9. The method of claim 7, further comprising:
presenting to the client device a countdown timer indicating a remaining duration of the presentation.

10. The method of claim 1, wherein the retrieved portion of the first set of high-priority stream portions comprise stream portions from two or more different channels.

11. A system for managing presentation of stream portions on a client device, the system comprising at least one processor configured to:

receive a first list of stream portions associated with a first plurality of stream portions;

determine a first set of high-priority stream portions from the first plurality of stream portions;

retrieve from a channel at least one portion of the first set of high-priority stream portions;

store in a memory the retrieved at least one portion of the first set of high-priority stream portions;

receive a second list of stream portions containing a second plurality of stream portions;

determine a second set of high-priority stream portions from the first set of high-priority stream portions and the second plurality of stream portions;

determine whether one or more stream portions in the stored at least one portion of the first set of high-priority stream portions are not in the second set of high-priority stream portions;

delete from the memory one or more stream portions in the stored at least one portion of the first set of high-priority stream portions that are not in the second set of high-priority stream portions;

determine whether one or more stream portions in the second set of high-priority stream portions are not stored in the memory;

retrieve from the channel at least one portion of one or more stream portions in the second set of high-priority stream portions that are not stored in the memory;

store in the memory the retrieved portion of one or more stream portions in the second set of high-priority stream portions that are not stored in the memory;

upon receipt of a marker, retrieve from the memory a particular stream portion, wherein the marker indicates presentation of the particular stream portion;

present the particular stream portion to the client device; and receive a marker to resume a previous stream upon completion of the particular stream portion.

12. The system of claim 11, wherein the first list of stream portions includes a first plurality of priority values, and the second list of stream portions includes a second plurality of priority values.

13. The system of claim 12, wherein the first plurality of priority values and the second plurality of priority values are associated with numeric values or one or more characteristics of a user associated with the client device.

14. The system of claim 11, wherein at least one portion in the first list of stream portions is associated with a first time window, and at least one portion in the second list of stream portions is associated with a second time window.

15. The system of claim 11, wherein a first set of stream portions in the first plurality of stream portions or second plurality of stream portions is associated with a first plurality of client devices, and a second set of stream portions in the first plurality of stream portions or second plurality of stream portions is associated with a second plurality of client devices.

16. The system of claim 11, further comprising:
requesting the first list of stream portions when the client device is connected to a first group of channels; and
requesting the second list of stream portions when the client device is connected to a second group of channels.

17. The system of claim 11, further comprising:
determining whether the client device is attempting to connect from a first channel to a second channel during the presentation of the particular stream portion; and
preventing connection to the second channel during the presentation of the particular stream portion.

18. The system of claim 17, further comprising:
presenting to the client device information associated with the second channel.

19. The system of claim 17, further comprising:
presenting to the client device a countdown timer indicating a remaining duration of the presentation.

* * * * *